Jan. 9, 1968  J. P. CROTTY  3,363,213

REGULATED AC POWER SUPPLY

Filed Jan. 21, 1964

INVENTOR.
John P. Crotty
BY
Hugh L. Fisher
ATTORNEY

United States Patent Office 3,363,213
Patented Jan. 9, 1968

3,363,213
REGULATED AC POWER SUPPLY
John P. Crotty, New Berlin, Wis., assignor to General Motors Corporation, Detroit, Mich., a corporation of Delaware
Filed Jan. 21, 1964, Ser. No. 339,180
2 Claims. (Cl. 328—267)

ABSTRACT OF THE DISCLOSURE

The amplitude of an alternating voltage is determined by superimposing the voltage on a positive DC voltage of known amplitude. The composite waveform is fed into an operational amplifier which amplifies only the portion of the composite which is of negative polarity. The amplifier output is metered to determine the average value of the output, if desired, or incorporated into a closed loop feedback arrangement connected to a pentode tube to provide a regulated AC power supply.

This invention relates to a method and apparatus for measuring and controlling alternating voltage waveforms to a high degree of precision and, more particularly, to a method and apparatus for determining the magnitude of an unregulated alternating voltage waveform by comparison of the waveform to a DC reference voltage of known magnitude.

In accordance with the current state of the art, it is possible to obtain a DC voltage standard which is extremely accurate. Accordingly, it is also possible to control DC voltages to an extremely high degree of precision. For example, DC standard cells and Zener diodes may be used as DC voltage reference elements to very accurately measure or control by means of a comparison technique another DC voltage. However, the current state of the art does not allow provision of an AC voltage standard or the measurement of an AC voltage to the same degree of precision as is possible with respect to DC voltages.

It is an object of this invention to provide a method for accurately measuring an AC voltage. In general, the method involves the combination of an alternating voltage waveform to be measured with a DC voltage of precisely known magnitude, the amplification of the composite signal corresponding to that portion of the alternating voltage which is opposite in polarity to the DC reference and of greater amplitude than the DC voltage and the measurement of this amplified signal.

It is a further object of this invention to provide an apparatus for measuring the magnitude of an alternating voltage waveform. In general, this apparatus includes a means for producing a DC voltage of precisely known amplitude, means for combining an alternating voltage waveform to be measured with the DC voltage, means for amplifying that portion of the alternating voltage which is of opposite polarity to the DC reference and greater in amplitude than the DC reference, and means for measuring the value of the amplified signal.

It is a further object of this invention to provide an alternating voltage standard or regulated power supply. In general, this is accomplished by means of a closed loop feedback control network including control means for amplitude regulating a raw AC signal, a feedback circuit from the output of the control means to the input of an amplifier means, a DC reference source also connected to the input of the amplifier means such that the amplifier means receives a combined input consisting of a regulated alternating voltage and a precisely known DC reference voltage. The output of the amplifier means which consists of a signal waveform corresponding to an amplified version of that part of the composite signal which is produced when the half-cycle of the alternating voltage which is opposite in polarity to the DC reference voltage exceeds the DC reference voltage in amplitude, this signal being connected to a control point in the control means to complete the feedback control circuit.

These and other objects, as well as the means by which they are accomplished, will become more apparent upon reading of the following specification describing the invention by reference to illustrative embodiments which are shown in the accompanying drawings of which:

Figures 1, 2:
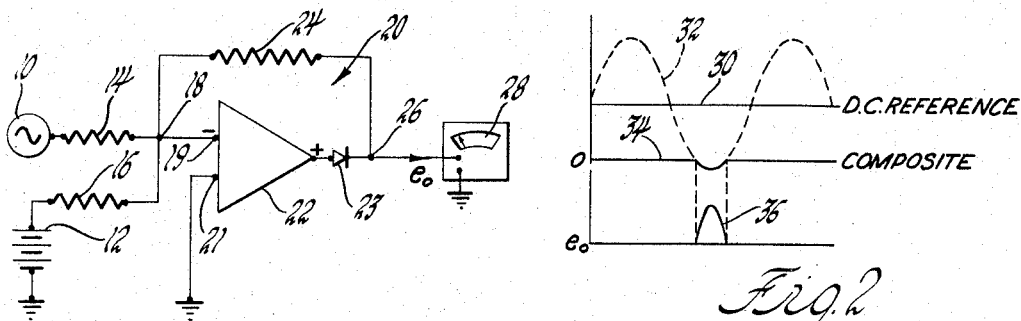
FIGURE 1 is a schematic diagram of a particular circuit for carrying out the present invention.
FIGURE 2 is a chart of waveforms illustrating the operation of the specific embodiment of FIGURE 1.

Referring now with particularity to FIGURE 1, an unregulated or raw alternating voltage of sinusoidal waveform is produced at 10. A DC standard reference voltage of precisely known potential is produced by a DC standard source indicated at 12. The alternating voltage and the DC voltage are effectively combined by means of resistors 14 and 16 which respectively connect the AC and DC voltages to a point 18. This point is connected to an input 19 of an operational amplifier indicated at 20. The other input 21 of the operational amplifier is shown connected to ground for voltage reference purposes. As is understood by those skilled in the art, an operational amplifier is a controlled feedback DC amplifier which inverts and amplifies a signal of predetermined polarity applied thereto. In general and as is shown in the specific example, the operational amplifier 20 includes an amplifier section 22, a rectifier in the form of a diode 23 connected to the output thereof and a feedback path consisting of a resistor 24 connected between an output terminal 26 of the amplifier 20 and the input point 18. The output terminal 26 of the operational amplifier 20 is shown connected to an average reading DC voltmeter 28.

In operation, the circuit of FIGURE 1 may be seen to perform the steps of providing a DC reference voltage of precisely known amplitude, from the source 12, combining this reference voltage with an alternating signal to be measured from 10, amplifying a portion of the composite signal and determining the magnitude thereof. This is more clearly shown with reference to the waveforms of FIGURE 2.

In FIGURE 2 the DC reference level produced by the standard source 12 is indicated at 30. Superimposed upon this DC level 30 is a sinusoidal waveform 32 which represents the output of the source 10 shown in FIGURE 1. As previously stated, the operational amplifier 20 is a DC amplifier. Thus, it is responsive to signals of only a negative polarity as indicated by the sign at input 19, to provide high gain amplification of such signals. Accordingly, it can be seen by reference to FIGURE 2 that the sum of the DC voltage 30 from source 12 and the AC waveform 32 from source 10 goes below the zero or reference level 34 for only that portion of the negative half-cycle of the alternating waveform 32 which is greater in amplitude than the DC reference level 30. The operational amplifier 20 is responsive to this composite negative signal to produce a highly amplified voltage pulse as shown at 36 in FIGURE 2. It is to be understood that the amplification factor is not shown by an accurate scaling of the waveforms of FIGURE 2; in fact, extremely high gain may be employed in the operational amplifier 20. The output waveform 36 which is produced by the amplifier 20 is connected to the average reading voltmeter 28 where a determination of the magnitude or amplitude of the alternating waveform 32 may be determined from the comparison of this waveform to the DC reference level 30 at the input of the amplifier 20. From an appropriate selection of the DC standard, and a calibration of the meter 28, the amplitude of the AC signal from source 10 may be precisely determined from a comparison with a DC reference signal from source 12.

It is to be particularly noted with reference to FIGURE 1 that the combined AC and DC voltages from the sources 10 and 12 respectively are combined by means of resistors 14 and 16 at the input 19 to the operational amplifier 20. The amplifier 20 thus serves to rectify the combined waveform in that it is responsive only to that portion of the composite waveform which is of a negative polarity and to amplify and invert this portion of the signal to produce a positive signal 36 as shown in FIGURE 2. By comparing the AC and DC voltages at the input 19 of the amplifier 20, the overall accuracy of the comparison is improved by minimizing the effect of error contributions made by the amplifier 20 and the diode 23. In other words, system-generated errors are added to the combination of the AC and DC signals and since they occur within the amplifier loop, are corrected by negative feedback through resistor 24. A further benefit is the result of the fact that the difference between the reference voltage 30 and the AC waveform 32 may be made very small by proper selection of the DC standard and, thus, extremely high gain may be employed in the amplifier 20. High gain, of course, affords high resolution in input signal variations and, thus, the amplitude of the alternating waveform 32 may be measured to the highest degree of accuracy possible in the meter 28.

As shown in the foregoing description the invention as embodied in the apparatus shown in FIGURE 1 is effective to produce an output signal which is precisely related to the magnitude of an alternating voltage waveform. Accordingly, where it is desired to regulate an alternating voltage, the output signal from the invention as shown in FIGURE 1 may be employed as a control signal to thereby regulate the magnitude of an alternating voltage waveform. A system for performing such an operation is shown schematically in FIGURE 3.

Figure 3:
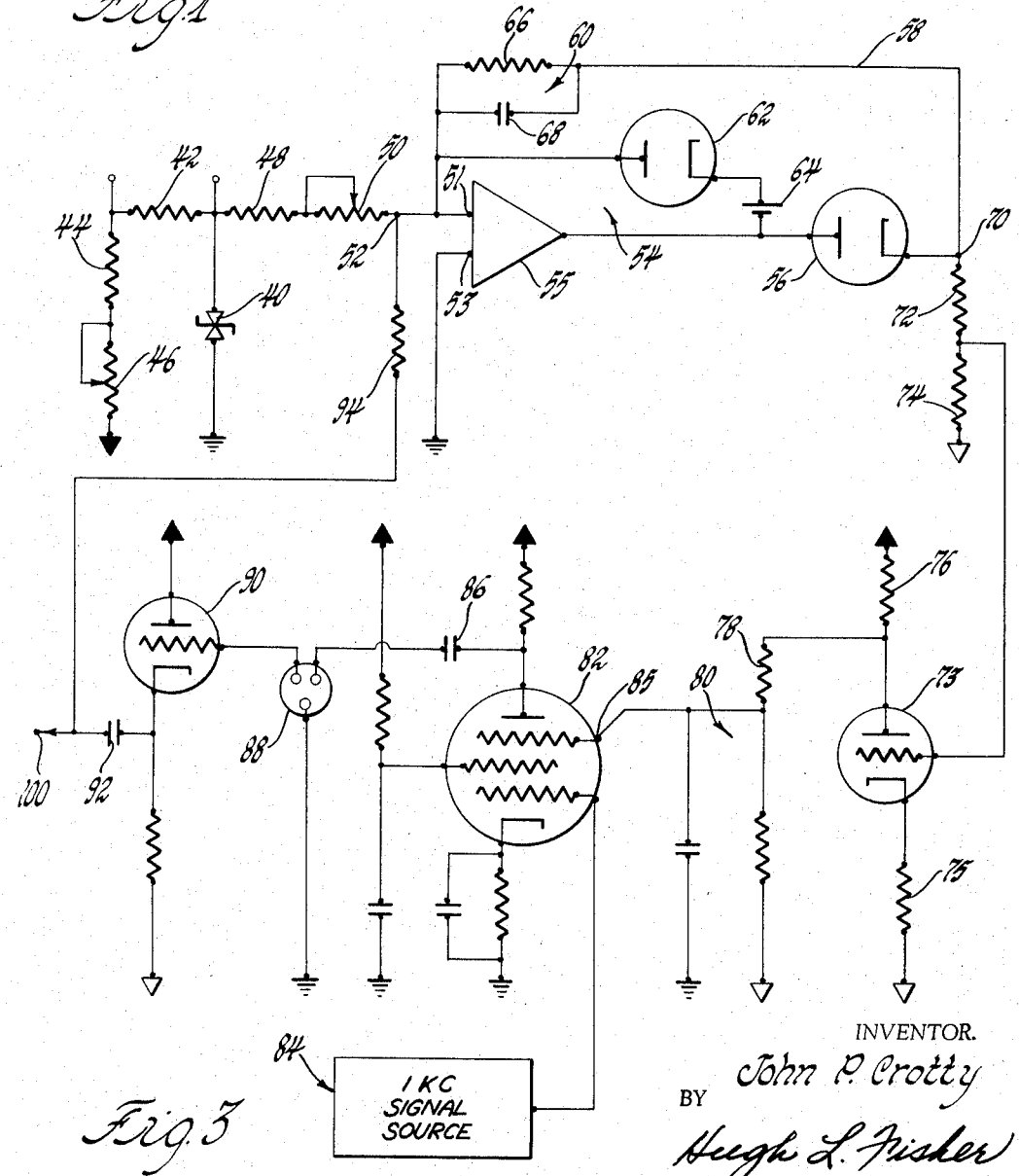
FIGURE 3 is a schematic diagram of a power supply embodying the present invention.

Referring particularly to FIGURE 3, there is shown a DC reference voltage source in the form of a Zener diode 40. The Zener diode 40 is connected on one end to ground and on the other end across a network consisting of resistors 42, 44 and 46 to a high DC voltage supply suggested by the dark arrowhead. As previously mentioned, the Zener diode affords a second means for providing an extremely accurate DC reference voltage. The DC voltage as provided by the Zener diode 40 is connected by means of a fixed resistor 48 and an adjustable resistor 50 to a point 52 which is connected to a first input 51 of an operational amplifier 54. The other input 53 is connected to ground as shown. The operational amplifier 54 comprises an amplifier section 55, a diode 56 connected in the output circuit and a feedback circuit 58 including an RC network 60 connected across the output and input of the amplifier 54 to determine the gain thereof. The operational amplifier 54 also includes a diode 62 having the cathode thereof connected through a low voltage DC source 64 to the anode of diode 56 and the anode thereof connected to the input 51 of the amplifier 54. This combination of diode 62 and source 64 is employed to prevent amplifier saturation during the unused portion of the composite input wave. The source 64 prevents diode 62 from operating unless the amplifier output exceeds a predetermined value. The RC network 60 comprises a resistor 66 connected in parallel with a capacitor 68. The resistor 66 determines the closed loop gain of the amplifier 54. The associated capacitor 68, together with the resistor 66, forms a peak filter. The output of the operational amplifier 54, appearing at point 70, is connected through a resistor network consisting of resistors 72 and 74 to the grid of a triode tube 73. The tube 73 has the cathode thereof connected to a low voltage source indicated by the light arrowhead through a resistor 75 and the anode connected through a resistor 76 to a high voltage supply as indicated by the dark arrowhead. Triode 73 is effective to amplify and invert the output of the operational amplifier 54 appearing at point 70 and to apply the signal, by means of resistor 78 and RC filter 80, to one grid 85 of a pentode tube 82. The output of a raw one kilocycle AC source 84 is connected to another grid of the pentode 82. The pentode 82, thus, serves as a control means to amplitude regulate the raw one kilocycle signal from source 84 in accordance with the nature of the control signal appearing at grid 85. The output of pentode 82 is fed through a capacitor 86 and a filter 88 to the grid of a second triode 90 which is connected as a cathode follower output stage. The output of triode 90, which is taken from the cathode thereof via capacitor 92, is communicated by means of a feedback circuit 94 to the input point 52 where it is combined with the DC reference voltage from the Zener diode 40 and applied to the input 51 of the operational amplifier 54. The output of cathode follower triode 90 also is taken as the regulated output signal from the output terminal 100.

In summary, the circuit of FIGURE 3 provides a feedback controlled power supply for accurately regulating the signal from the source 84 in accordance with the measured voltage output from the operational amplifier 54. The regulated output of the power supply appearing at terminal 100 is fed back to the input of operational amplifier 54 where it is combined with a DC signal of known magnitude. This combination waveform is then applied to the input of the operational amplifier 54 where that portion of the composite wave which corresponds with the portion of the alternating voltage which is opposite in polarity to the DC reference signal and of greater magnitude thereof is amplified and used as a control signal at the control means 82. The operation of the amplifier 54 is represented by the waveforms of FIGURE 2 as is the operation of the circuit shown in FIGURE 1.

It is to be understood that the invention has been described above with reference to specific embodiments thereof, and that additions and modifications of these circuits will be apparent to those skilled in the art, and, thus, the description is not to be taken in a limiting sense. For a definition of the invention reference should be made to the appended claims.

What is claimed is:

1. A stable AC power supply comprising means for generating a raw alternating voltage waveform, control means having input, output and control terminals and effective to regulate the amplitude of a signal applied to the input terminal in accordance with a signal applied to the control terminal thereof, the input terminal of the control means being connected to receive the alternating waveform, means for producing a DC voltage of predetermined amplitude, means for combining the signal appearing at the output of the control means with the DC voltage, amplifier means connected to receive the combined voltages and to amplify that portion of the combined waveform which is of a polarity opposite to that of the DC voltage, and means connecting the output of the amplifier means to the control terminal of the control means.

2. A stable AC power supply comprising means for generating a raw alternating voltage waveform, control means having input, output and control terminals and effective to regulate the amplitude of an alternating voltage applied to the input terminal thereof in accordance with a signal applied to the control terminal thereof, the input terminal being connected to receive the raw alternating voltage, a source of a DC reference voltage of predetermined amplitude, means for combining the signal appearing at the output terminal of the control means with the DC voltage, an operational amplifier connected to receive the combined voltages and to amplify that portion of the combined voltages which is of a polarity opposite to that of the DC voltage, and means to connect the output of the operational amplifier to the control terminal of the control means.

References Cited

UNITED STATES PATENTS

| | | | |
|---|---|---|---|
| 2,653,285 | 9/1953 | Gray | 318—227 |
| 3,093,783 | 6/1953 | Hass | 318—327 |
| 3,153,187 | 10/1964 | Klees | 323—22 |
| 3,237,082 | 2/1966 | Heller | 321—18 |
| 2,819,397 | 1/1958 | Davis | 328—149 |
| 2,847,637 | 8/1958 | Grib | 323—22 |
| 2,849,606 | 8/1958 | Parker et al. | 328—146 |
| 3,311,835 | 3/1967 | Richman | 328—146 |

JOHN F. COUCH, *Primary Examiner.*

W. E. RAY, *Examiner.*

K. D. MOORE, *Assistant Examiner.*